United States Patent [19]

Yamamoto

[11] Patent Number: 5,746,962
[45] Date of Patent: May 5, 1998

[54] METHOD OF INSERT MOLDING PLASTIC PARTS TO PROVIDE COVERED EDGE SURFACES

[75] Inventor: Hiroaki Yamamoto, Brookville, Ohio

[73] Assignee: Green Tokai Co., Ltd., Brookville, Ohio

[21] Appl. No.: 706,976

[22] Filed: Sep. 3, 1996

Related U.S. Application Data

[63] Continuation of Ser. No. 372,230, Jan. 13, 1995, abandoned.

[51] Int. Cl.$^6$ .......................... B29C 45/14; B29C 45/16
[52] U.S. Cl. ............................... 264/266; 425/112
[58] Field of Search ..................... 264/266; 425/112

[56] References Cited

U.S. PATENT DOCUMENTS

| | | | |
|---|---|---|---|
| 3,289,253 | 12/1966 | Buonaiuto | 18/47 |
| 3,290,082 | 12/1966 | Fritsch | 293/1 |
| 3,359,030 | 12/1967 | Newman | 293/1 |
| 3,388,523 | 6/1968 | Evans | 51/717 |
| 3,444,275 | 5/1969 | Willett | 264/26 |
| 3,451,709 | 6/1969 | Swauger | 293/1 |
| 3,493,257 | 2/1970 | Fitzgerald et al. | 293/71 |
| 3,506,294 | 4/1970 | Newman | 293/1 |
| 3,715,138 | 2/1973 | Finkle | 293/1 |

(List continued on next page.)

OTHER PUBLICATIONS

Brochure "Brilliant Performance" by Rexham Branded Products, Rexham Corporation, Oct. 1987.
Publication "SAE Technical Paper Series" Paint Film Laminate Technology Provides Painted Thermoplastic Parts Without VOC Issues, by Charles H. Fridley, Avery Automotive Div., Truck and Bus Meeting and Exposition, Detroit, Michigan, Oct. 29 –Nov. 1, 1990.
Product Sheet "AVLOY Paint Film Laminate".
Product Sheet "In–Mold Foil" Avery Dennison, Automotive Div.
Product Sheet "AVLOY Converting Process" Avery Dennison, Automotive Div.
Product Sheet "AVLOY Production Process".
Product Sheet "OEM Approval" Avery Dennison, Automotive Div.
Product Sheet "AVLOY Formable Finish" Avery Dennison, Automotive Div.
Product Sheet Florida Exposure—20° Gloss Retention—Parts Avery Dennison, Automotive Div.
Product Sheet "Chemical Resistance" Avery Dennison, Automotive Div.
Product Sheet "Graphicolor Vinyl Siding Process".

*Primary Examiner*—Jan H. Silbaugh
*Assistant Examiner*—Edmund H. Lee
*Attorney, Agent, or Firm*—Biebel & French

[57] ABSTRACT

Improved methods of insert molding a laminated film or the like over a plastic substrate and fused film—plastic parts made thereby are disclosed. Improvement in traditional insert molding techniques is provided by use of a specific mold cavity structure which facilitates overlaying of the paint film over the desired edge portion of the plastic part. In the mold cavity portion corresponding to the part edge for which overlapping is desired, a special extension or pocket portion of the mold cavity is constructed. The pocket portion is bounded by a wall surface that extends or slopes from the female mold side (cavity side) of the mold to the male mold side. The painted side of the paint film laminate is inserted against this wall with the paint side of the paint film laminate facing the wall. During the injection molding process, the pressurized resin injected into the mold impinges upon the backing sheet side of the film forcing the film to extend along the wall. Deposition of the paint film along the wall and fusing of the backing sheet with the underlying resin thereat means that the part, after completion of the molding cycle, will include a paint film covered edge in contrast to prior art insert molded parts which are characterized by inclusion of a gap in the film covering located along edgewise portions of the insert molded part.

6 Claims, 3 Drawing Sheets

U.S. PATENT DOCUMENTS

| | | | |
|---|---|---|---|
| 3,843,475 | 10/1974 | Kent | 161/4 |
| 3,897,967 | 8/1975 | Barenyl | 293/1 |
| 3,914,482 | 10/1975 | Sawa et al. | 428/31 |
| 3,959,538 | 5/1976 | Loew | 428/31 |
| 4,015,760 | 4/1977 | Bott | 224/42.1 |
| 4,066,285 | 1/1978 | Hall et al. | 293/62 |
| 4,083,592 | 4/1978 | Rubin et al. | 293/71 R |
| 4,154,893 | 5/1979 | Goldman | 428/375 |
| 4,160,052 | 7/1979 | Krysiak | 428/31 |
| 4,174,986 | 11/1979 | Jennings | 156/160 |
| 4,197,688 | 4/1980 | Mauer | 52/718 |
| 4,216,184 | 8/1980 | Thomas | 264/229 |
| 4,298,324 | 11/1981 | Soulier | 425/174.8 |
| 4,334,700 | 6/1982 | Adell | 280/770 |
| 4,334,706 | 6/1982 | Seki | 293/126 |
| 4,358,482 | 11/1982 | Jubelt | 427/259 |
| 4,364,789 | 12/1982 | Moran | 156/214 |
| 4,401,232 | 8/1983 | Constable et al. | 220/450 |
| 4,408,432 | 10/1983 | Carter et al. | 52/718 |
| 4,414,731 | 11/1983 | Riemer | 29/453 |
| 4,489,019 | 12/1984 | Takeda et al. | 264/26 |
| 4,546,021 | 10/1985 | Mears | 428/31 |
| 4,579,755 | 4/1986 | Takeda et al. | 428/31 |
| 4,587,761 | 5/1986 | Adell | 49/462 |
| 4,587,762 | 5/1986 | Adell | 49/462 |
| 4,597,755 | 7/1986 | Samson et al. | 604/96 |
| 4,613,178 | 9/1986 | Fujita | 293/128 |
| 4,617,209 | 10/1986 | Ives | 428/31 |
| 4,619,847 | 10/1986 | Jackson | 428/31 |
| 4,671,974 | 6/1987 | Murachi | 428/31 |
| 4,710,338 | 12/1987 | Bagnall et al. | |
| 4,715,648 | 12/1987 | Hansel | 296/198 |
| 4,719,067 | 1/1988 | Thiel | 264/259 |
| 4,721,642 | 1/1988 | Yoshimi et al. | 428/90 |
| 4,722,818 | 2/1988 | Zoller | 264/171 |
| 4,724,585 | 2/1988 | Whitman | 24/295 |
| 4,726,614 | 2/1988 | Myers et al. | 293/128 |
| 4,734,147 | 3/1988 | Moore | 156/212 |
| 4,767,040 | 8/1988 | Miller et al. | 224/326 |
| 4,778,550 | 10/1988 | Barton et al. | 156/211 |
| 4,786,094 | 11/1988 | Barton et al. | 293/128 |
| 4,797,244 | 1/1989 | Saver | 264/266 |
| 4,808,450 | 2/1989 | Guy | 428/31 |
| 4,906,421 | 3/1990 | Plamthottam et al. | 264/22 |
| 4,940,557 | 7/1990 | Kimura | 264/26 |
| 5,000,902 | 3/1991 | Adams | 264/510 |
| 5,023,033 | 6/1991 | Cakmakci | 264/161 |
| 5,063,014 | 11/1991 | Cakmakci | 264/151 |
| 5,087,488 | 2/1992 | Cakmakci | 428/31 |
| 5,100,728 | 3/1992 | Plamthottam et al. | 428/345 |
| 5,108,681 | 4/1992 | Cakmakci | 264/151 |
| 5,178,708 | 1/1993 | Hara et al. | 156/242 |
| 5,193,711 | 3/1993 | Hirata et al. | 220/453 |
| 5,203,941 | 4/1993 | Spain et al. | 156/209 |
| 5,240,751 | 8/1993 | Cakmakci | 428/31 |
| 5,242,650 | 9/1993 | Rackovan et al. | 264/509 |

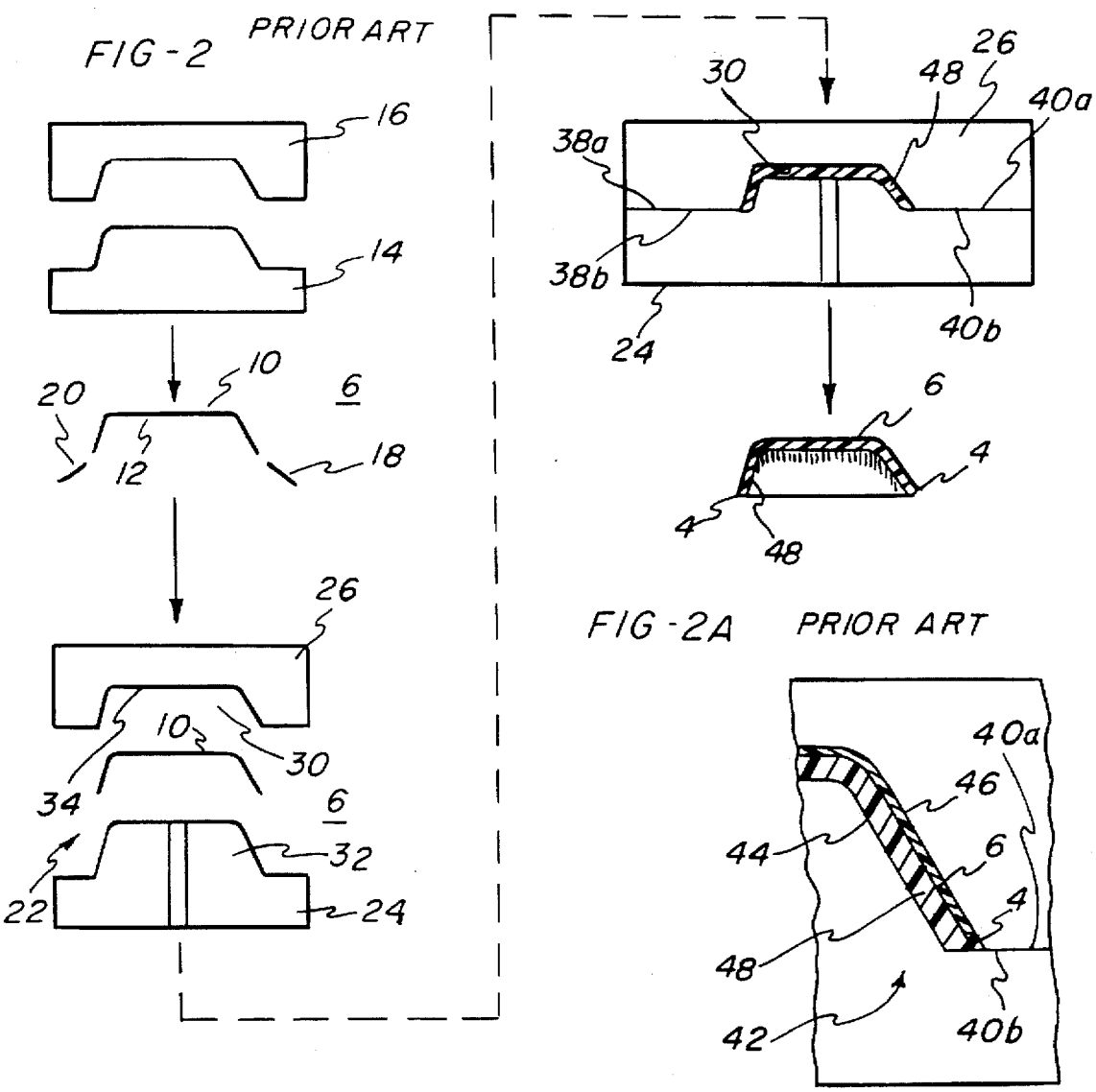

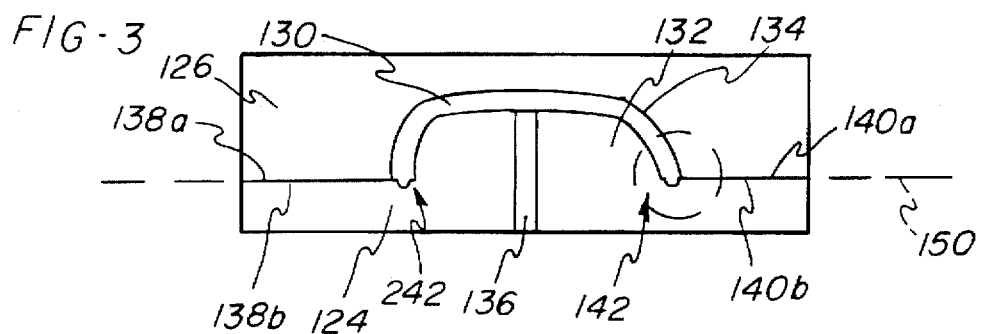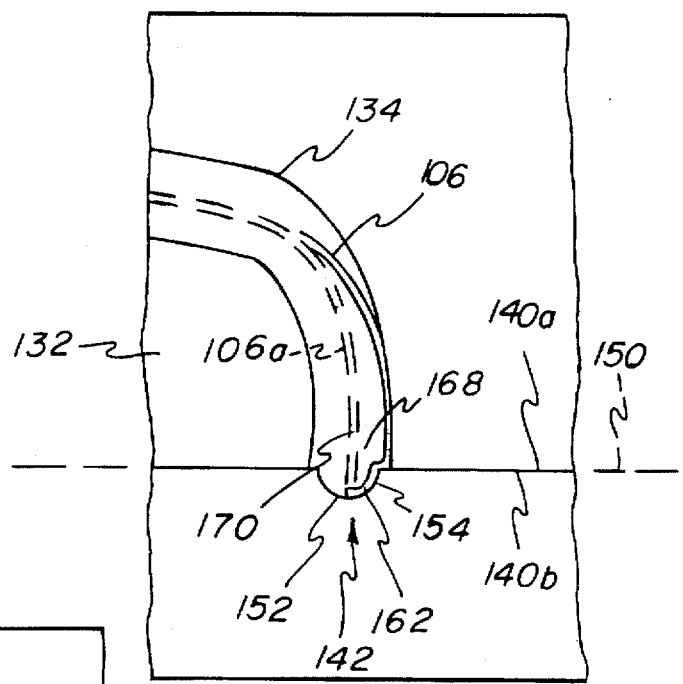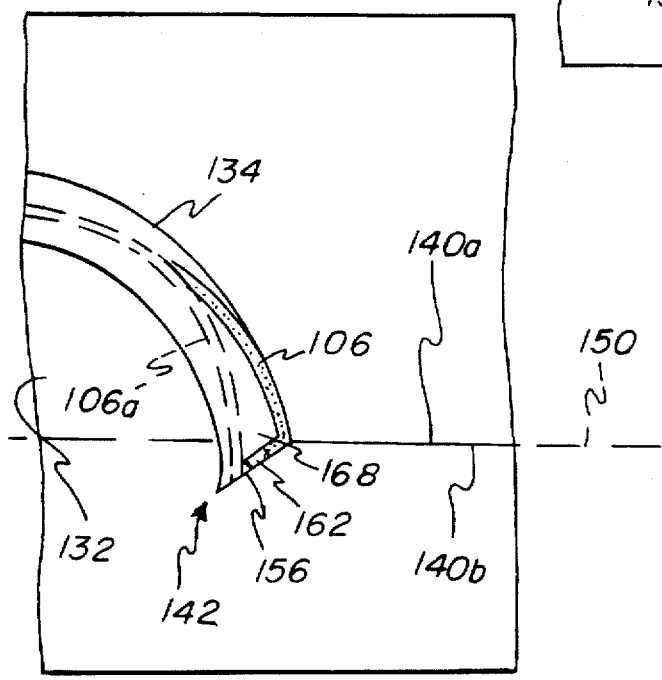

_5,746,962_

1

METHOD OF INSERT MOLDING PLASTIC PARTS TO PROVIDE COVERED EDGE SURFACES

This is a continuation of Ser. No. 08/372,230 filed Jan. 13, 1995, now abandoned.

FIELD OF THE INVENTION

The present invention pertains to improved methods of insert molding a laminated film or the like over a plastic substrate and to fused film—plastic parts made thereby.

BACKGROUND OF THE INVENTION

A variety of injection molded parts have been made and used for automobile body and trim parts. For example, bumpers, body panels, doors, filler panels, wheel covers, dashboard, arm rests and other parts have been made via injection molding techniques. Additionally, with regard to automobile exteriors, bodyside moldings, beltline moldings, roof moldings and window moldings are made via injection molding of PVC or other thermoplastic materials.

In order to provide a painted surface for these parts, film lamination techniques have been successfully employed. In accordance with these processes a paint film laminate is insert molded with the desired thermoplastic to fuse the film over the injection molded part. The resulting injection molded part is ready for assembly without subsequent painting.

The paint film laminate used in these insert molding techniques may comprise a backing sheet of about 0.020" in thickness to which paint layers are adhered.

Typically, the backing sheet comprises an extruded thermoplastic sheet.

In such paint film laminates, a paint film, comprising a cast dried continuous paint coating, is provided over the backing sheet. The paint film may consist of a monocoat, a clear coat over a base coat or a clear coat and a base coat with interposed print or design. The paint film, including base coat, clear coat and print or design, if desired, may range from about 0.5–4 mil. in thickness.

The laminated paint films are available, for example from Avery Dennison, Automotive Division or Rexham Decorative Products, Charlotte, N.C. The films are typically provided in a roll, unwound, then trimmed to a proper "preform" size and shape, ready for insertion into the injection mold. The preform is usually placed along the cavity side of the mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occur. Injection molds used for these processes are rear or edge gated so that the molten resin is directed along the backside of the film.

Although these processes provide significant advantage, they are not without problem. For example, edgewise portions of the part, such as the longitudinally extending edges of elongated strips used for body moldings, may not be completely covered with the film. Accordingly, these edges reveal the uncovered plastic substrate and provide an aesthetically displeasing appearance since the continuity of the printed surface is interrupted by the unsightly appearance of the underlying plastic substrate.

Accordingly, there remains a need in the art to improve upon the existing methods for insert molding of a film laminate over a plastic substrate in such manner that the desired edge portions of the substrate are covered by the film.

SUMMARY OF THE INVENTION

These and other objects of the invention are met by the instant methods and fused film—plastic parts made thereby.

Briefly, improvement in traditional insert molding techniques is provided by utilization of a specific mold cavity structure which facilitates overlaying of the paint film over the desired edge portion of the plastic part. More specifically, in the mold cavity portion corresponding to the part edge for which overlapping is desired, a special extension or pocket portion of the mold cavity is constructed. This pocket portion is bounded by an inclined surface that extends or slopes from the female mold side (i.e. the cavity side) to the male mold side. In the preferred process, the painted side of the paint film laminate is inserted adjacent this pocket portion surface. During the injection molding process, the resin impinges upon the backing sheet side of the film forcing the film to extend along the pocket portion surface. Disposition of the paint film along this surface and fusing of the backing sheet with the underlying resin thereat means that the part, after completion of the molding cycle, will exhibit a paint film covered edge in contrast to prior art insert molded parts which are characterized by inclusion of a gap in the film covering located along the edge of the part.

The invention will be further described in conjunction with the appended drawings and following detailed description.

BRIEF DESCRIPTION OF THE DRAWINGS

FIG. 1 is a plan view of an insert molded body side molding part made in accordance with the prior art methods;

FIG. 1a is a side elevational view of the prior art body side molding shown in FIG. 1;

FIG. 2 is a schematic flow chart showing the prior art process;

FIG. 2a is a magnified sectional view of a portion of a mold cavity used in the prior art process shown in FIG. 1;

FIG. 3 is a sectional view of a preferred mold cavity in accordance with the invention;

FIG. 4 is a magnified sectional view of an extension or pocket portion of the mold cavity shown in FIG. 3;

FIG. 5 is a magnified sectional view of an alternate mold cavity pocket portion embodiment of the invention;

DETAILED DESCRIPTION OF THE INVENTION

Figure 6:
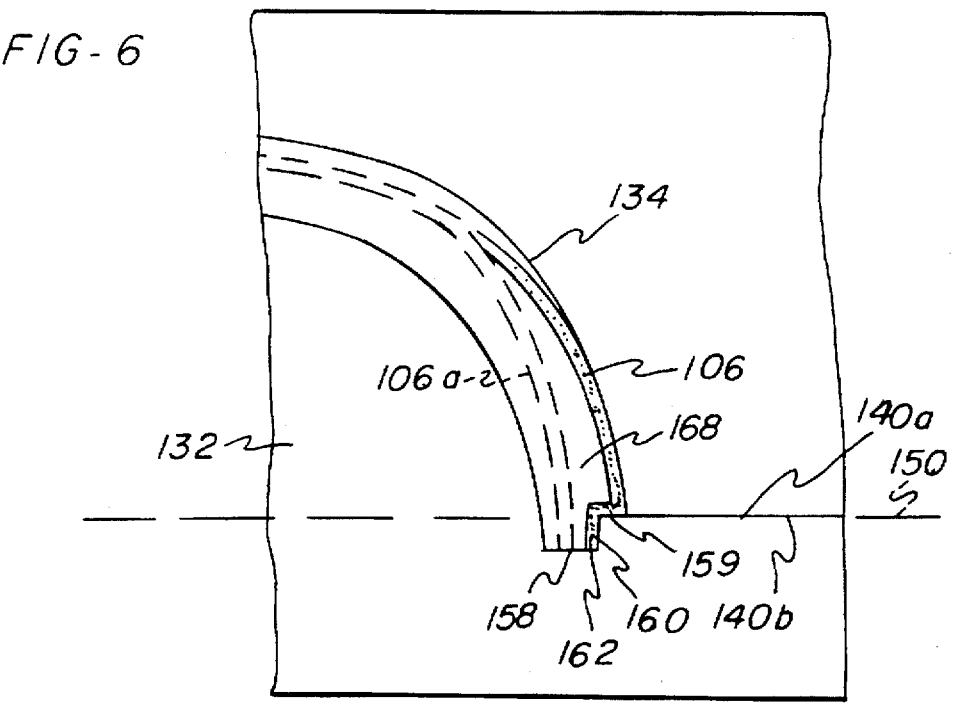
FIG. 6 is a magnified sectional view of another mold cavity pocket portion embodiment of the invention.

Turning now to FIGS. 1 and 1a of the drawings, there is shown body side molding number 2 made in accordance with the prior art insert molding processes of the type referred to in the Background Of the Invention, supra.

Body side molding 2 comprises an elongated strip covered with paint film 6 along most of its outside surface, but characterized by gap 4 in the covering by film 6, which gap 4 extends along longitudinally extending edge 8 of the molding.

The present invention is directed toward methods and structures for eliminating the provision of gap 4 along edgewise portions of insert molded plastic parts.

Turning now to FIG. 2, there is schematically shown a process flow diagram of a prior art process of the type in which the molding 2 of FIGS. 1 and 1a was made. Laminated paint film 6 comprising paint side 10 and underlying base layer 12 is first preformed by compressing and heating the film between male mold member 14 and female (cavity) mold member 16 to impart the desired basic shape to film 6.

After the film has been preformed, it is trimmed along its longitudinally disposed edge portions 18,20 and along other requisite surfaces if necessary so that it may be inserted into the mold cavity of an injection molding station shown diagrammatically at 22.

As shown, molding station 22 includes male mold member 24 and corresponding female cavity mold member 26 adapted to mate to define mold cavity 30 therebetween; interposed between male core 32 (shown as being semi-cylindrical in cross-section) and cavity surface 34 of the female cavity mold member 26.

Film, such as a paint laminate, is placed in the mold cavity 30 with its painted side 10 facing cavity surface 34. Gate 36 is provided thru core 32 and serves as an inlet for pressurized flow of molten resin, for example a thermoplastic or thermoset resin such as polypropylene or PVC, therethrough so as to fill mold cavity 30, pushing film 6 up against cavity surface 34.

During the injection molding process the male mold 24 and female mold 26 are clamped or securely fastened together with resin fed thru gate 36 from an extruder (not shown) or the like. Male mold 24 and female mold 26 mate along flat, horizontally disposed surfaces 38a,38b and 40a, 40b effectively closing the mold so that plastic injected into the cavity cannot leak or penetrate into any gap existing between these surfaces.

As shown in FIG. 2a, a magnified cross-sectional view of one end or edge portion of the prior art mold is shown. This edge portion of the mold cavity 30 is referred to as a pocket portion 42, signifying an end-wise portion of mold cavity 30 that corresponds to an edgewise portion of the part to be made in the mold.

Here pocket portion 42 will correspond to edge 8 of the molding shown in FIG. 1.

Pocket portion 42, of the prior art, is defined by core wall surface 44, surface 40b of the male mold 24 and the pocket surface 46 extension of the female cavity surface 34. Upon molding, the film 6 does not cover the entire surface of plastic 48 disposed underneath (or to the core side of the mold). Gap 4 therefore appears alongside the edge of the part.

Turning now to FIG. 3, there is shown a modified mold cavity adapted for practice of the invention. In FIGS. 3–8, reference will be made to an insert molding process and structure therefor for production of a paint film covered elongated body side molding member. It should be remembered, however, that reference to this specific part is not meant to limit the invention. The invention finds equal applicability to the production of a myriad other parts such as those referred to for example in the Background Of The Invention.

Turning now to FIG. 3, mold cavity 130 is defined by the space between male mold member 124 and female cavity mold 126. Male mold member 124 includes core 132 with opposed cavity surface 134 formed in the female mold member. As shown, core 132 is generally semi-circular in transverse cross-section. Gate 136 extends upwardly into cavity 130 and dissects the area defined by the semi-circular cross-sectional shape of the core.

The male and female mold members mate along abutting horizontally disposed planar surfaces 138a,b, 140a,b and together define a generally horizontally disposed plane (shown by the dot-dash line) 150 dividing the mold members into a top half disposed above this plane and a bottom half disposed beneath the plane.

So as to facilitate overlapping of the film 6 over the edge of the plastic article as a result of the insert molding process, pocket parts 142 and 242 are formed along opposed right and left hand extremities of mold cavity 130 below plane 150.

Viewing FIG. 4, pocket portion 142 is therein shown corresponding to what will be the longitudinally extending right hand side of an elongated film covered body side molding. Pocket 142 is bounded by an inclined surface that extends from the female mold member side of the mold cavity located at this edgewise mold cavity portion toward the male mold member side of the mold cavity located at this same edgewise mold cavity portion. Here, the inclined pocket portion surface comprises a substantially semi-circular groove 152, the right hand surface portion 154 of which slopes from the cavity side of the mold toward the core side.

Paint film laminate is shown as 106 in FIG. 4 with the film laminate also shown in phantom by the dot-dash line 106($a$) in the figure. During the preferred insert molding process, the film is originally positioned as shown at 106a extending into the pocket portion 142 with its painted side facing surface 154. As a result of the injection of resin into the mold cavity, the film is moved to the position shown by reference numeral 106 in which it completely covers wall 154 and bends backwardly toward core 132 to provide a flap 162. Due to the provision of wall 154 which slopes backwardly toward the core, the film is forced to follow or mirror the configuration of the wall 154, thereby providing a cover or flap 162 over the edge of the resin located in region 168 of the mold corresponding to an edgewise portion of the molded part. As shown, a slit 170 can be formed partially through the film thickness at a location proximate to that portion of the film that extends into pocket 142. This slit helps to facilitate bending or curving of the film along the surface of wall 154 during the insert molding process.

FIG. 5 depicts another embodiment of the invention. Inclined pocket surface 156 connects the core and cavity side of the pocket 142 and slopes toward the core side as viewed from the extreme right hand side of the wall 156 (appearing in FIG. 5) to the left hand side of the wall.

Due to the provision of the inclined pocket portion surface 156, resin injected in the molding process will flow inside and along the configuration of cavity surface 134 and downwardly and back toward the core along inclined surface 156. Upon injection of the resin into the mold, film laminate 106 will move from its position shown at 106a and will cover wall 156 in substantially its entirety. Resin in region 168 of the pocket will have its top or face side (i.e. the side corresponding to the cavity surface of the mold) substantially completely covered with film by flap 162, eliminating the space or gap along this portion of the plastic part that exists with many of the conventional film laminate insert molded parts now utilized in the auto industry.

FIG. 6 shows yet another embodiment of the mold cavity pocket part extension that may be used in accordance with the invention. Here, the inclined pocket portion surface comprises a step-like configuration defined by a pair of spaced, horizontally extending walls 158,159 connected by vertically extending wall 160. The tip of film 106a extends into the pocket portion 142. When resin is injected into the mold, it pushes the film along cavity surface 134 and wall 159 and 160. Then, the film, as shown at 106, covers the top or edge side of resin in region 168 by the provision of flap 162.

Figure 7:
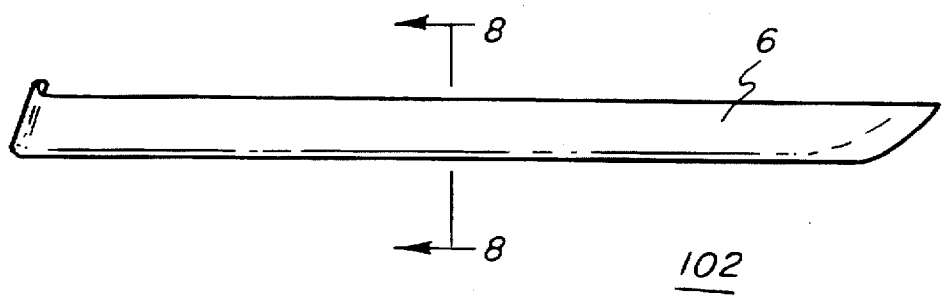
FIG. 7 is a plan view of a body side molding produced with the mold cavity shown in FIGS. 3 and 4.
Figure 8:
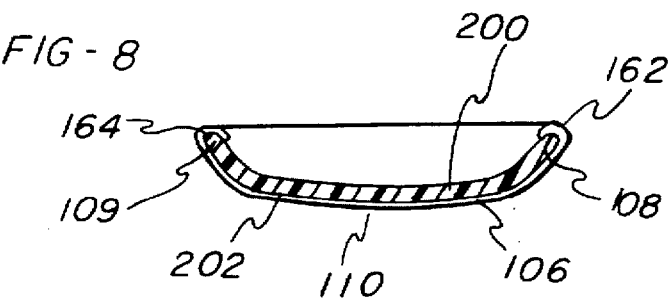
FIG. 8 is a transverse cross-sectional view of the body side molding taken along the lines and arrows 8—8 of FIG. 7.

Turning now to FIGS. 7 and 8, there is shown an insert molded part and a paint film laminate fused to and covering the plastic substrate. This part, shown in the figure as a body side molding 102 has been made utilizing the mold shown in FIG. 3 having right hand pocket portion and left hand pocket portion extensions 142,242 respectively to define longitudinally extending left hand and right hand edge portions of the molding 108,109 respectively. As best seen in FIG. 8, edges 109,108 are covered with film 6 by the provision of film flaps 162,164.

As shown in FIG. 8, molding 102 comprises an elongated plastic substrate 200 in the shape basically of a flattened "C" in cross-section. Face 202 of the substrate is completely covered by film 106, with the painted side of the film 110 displayed for aesthetic appeal. Longitudinal edges 108,109 are covered by flaps 162,164, formed as set forth above.

It is accordingly apparent that the present invention pertains to methods for making plastic parts by insert molding of paint films or the like over the underlying plastic substrate and to articles of manufacture made by such processes. In performing the process, a mold cavity is provided and includes at least one pocket portion extension thereof located between the male mold member and the female mold member. The pocket portion corresponds to an edgewise portion of the finished part for which film laminate overlapping is desired. Each pocket portion extension of the mold cavity is bounded by at least one inclined surface that extends from the cavity side of the mold toward the core side. The film laminate is first placed in the mold cavity with the painted side thereof facing the cavity side of the mold and with a sufficient length of film extending into the pocket portion. Molten resin or plastic such as PVC is injected into the mold cavity and impinges upon the base side of the film, forcing the film to a position contiguous with the cavity surface. Conventional injection molding pressures and temperatures are utilized during the process to ensure that the melt injected into the mold cavity fuses or bonds with the bottom or base layer of the film laminate.

Due to the provision of the specially configured pocket portion extremities of the mold cavities in accordance with the invention, the molten plastic, as it is injected into the mold cavity is directed along the inclined surface of the pocket portion in such manner that the film is superposed over the molten plastic in the pocket portion extension thereby defining a flap covering the edge of the plastic part.

As used commonly in practice, a pair of edgewise pocket portions will be provided, such as that shown in FIG. 3, wherein each pocket portion is located along an opposite edgewise portion of the mold cavity to thereby define longitudinally extending edge portions of an elongated shape such as an elongated bodyside molding. Preferably, the pocket portions are located below a horizontally extending plane defined by mating, abutting, interfacial surfaces of the male and female mold cavities respectively.

In accordance with the processes described above, an insert molded plastic article is provided wherein a film laminate or the like covers the intended face surface of an underlying injection molded plastic substrate and also covers, via the provision of flap, portions 162,164 (see FIG. 8) corresponding edge portions 108,109 of the substrate.

Having described the invention in detail and by reference to preferred embodiments thereof, it will apparent that modifications and variations are possible without departing from the scope of the invention defined in the appended claims.

What is claimed is:

1. Method of making a plastic part by insert molding of a paint film over a plastic substrate, comprising:

(a) providing a male mold member including a core portion and a female mold member having a surface defining a concavity therein said male mold member and said female mold member mating along planar surfaces and defining together a mold cavity and a plane dividing said mold members into halves on either side of said plane, said mold cavity being defined in one of said halves between said surface in said female mold member and said core portion and being further defined by at least one pocket portion in the other of said halves at an extremity of said mold cavity, said pocket portion being bounded by an inclined surface extending from said female mold member toward said male mold member;

(b) inserting a paint film into said mold cavity and positioning an end of said film into said pocket portion;

(c) injecting molten plastic into said mold cavity and directing said molten plastic along said inclined surface and against said film end positioned in said pocket portion whereby said film is superposed over said molten plastic and substantially covers said molten plastic positioned along said inclined surface, thereby forming said plastic part with an edge portion of said substrate substantially covered by said paint film.

2. Method as recited in claim 1 comprising providing a pair of pocket portions, each said pocket portion located along an opposite edgewise extremity of said mold cavity.

3. Method as recited in claim 1 wherein said paint film comprises a slit formed therein proximate said end positioned into said pocket portion.

4. Method as recited in claim 1 wherein said inclined surface comprises a substantially semi-circular cross-sectioned groove formed in said male mold member.

5. Method as recited in claim 1 wherein said inclined surface comprises a sloped, linear surface.

6. Method as recited in claim 1 wherein said inclined surface comprises a step configuration defined by a pair of spaced, horizontally extending walls and an intermediate wall interposed between and connecting said horizontally extending walls.

* * * * *